Figure 1:
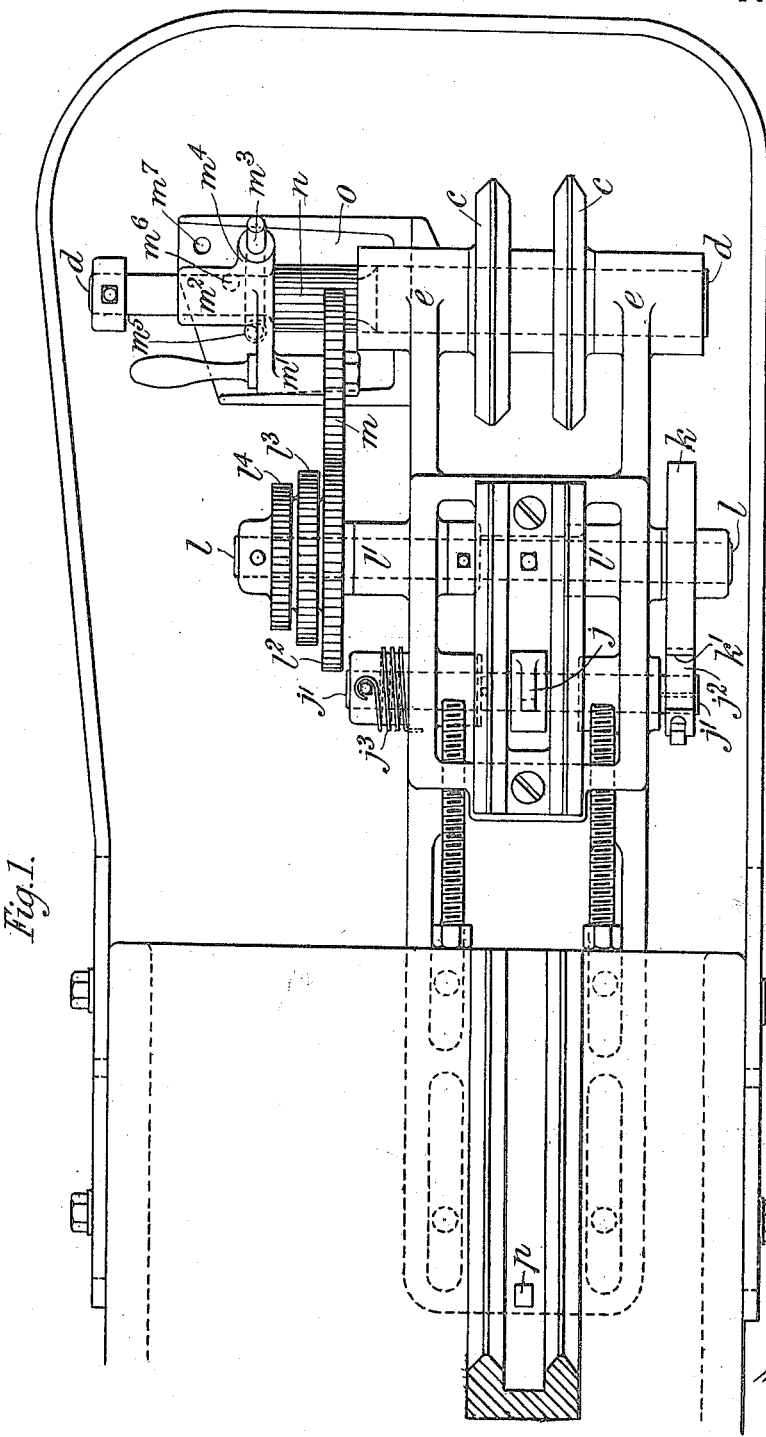

W. WILLS.
FEEDING DEVICE FOR LUMBER JOINTING MACHINES.
APPLICATION FILED MAY 7, 1917.

1,248,967.

Patented Dec. 4, 1917.
2 SHEETS—SHEET 1.

W. WILLS.
FEEDING DEVICE FOR LUMBER JOINTING MACHINES.
APPLICATION FILED MAY 7, 1917.
1,248,967.
Patented Dec. 4, 1917.
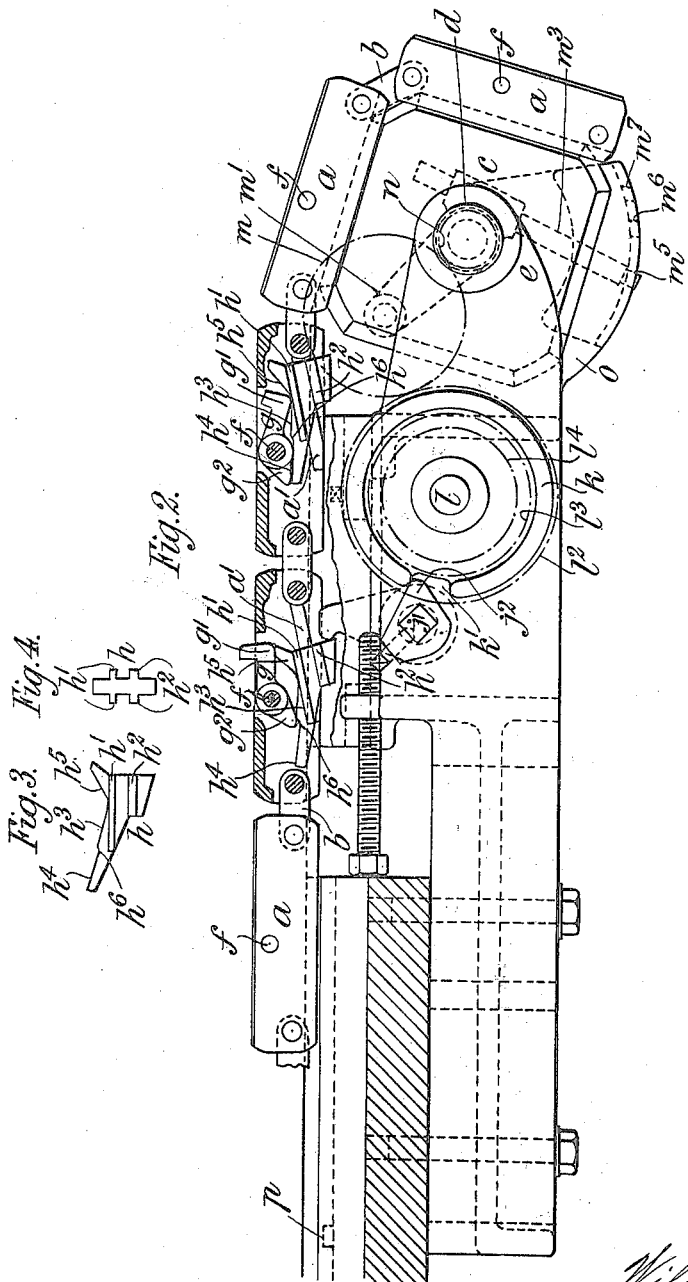

UNITED STATES PATENT OFFICE.

WILLIAM WILLS, OF NEWARK-UPON-TRENT, ENGLAND, ASSIGNOR TO A. RANSOME & COMPANY, LIMITED, OF NEWARK-UPON-TRENT, ENGLAND.

FEEDING DEVICE FOR LUMBER-JOINTING MACHINES.

1,248,967.  Specification of Letters Patent.  Patented Dec. 4, 1917.

Application filed May 7, 1917. Serial No. 166,956.

*To all whom it may concern:*

Be it known that I, WILLIAM WILLS, a subject of the King of Great Britain, residing at 70 Lindum Grove, Beacon Hill Road, Newark-upon-Trent, England, have invented a new and useful Improvement in Feeding Devices for Lumber-Jointing Machines, of which the following is a specification.

This invention relates to a feeding device for lumber jointing machines and is especially applicable for use with the machines described in Albert Thorp Linderman's Patent No. 827738.

According to this invention a link of the carrier chain by which the lumber is conveyed along a machine has pivoted to it a springless dog actuated by a sliding wedge which raises or lowers the pushing end of the dog and holds it positively in either position.

The accompanying drawings show a feeding device made in accordance with this invention applied to the feed of a lumber jointing machine. Figure 1 is a plan with the carrier chain removed and Fig. 2 is a part transverse section of the same with the carrier chain in position. Figs. 3 and 4 are a side view and end view respectively of the wedge for operating the dog.

The endless carrier chain by which the lumber is conveyed along the machine consists of carrier links $a$ connected together by coupling links $b$. The endless carrier chain passes over pulleys $c$, $c$, mounted upon a shaft $d$ supported by bearings $e$, $e$, at the end of the machine. To each carrier link $a$ is pivoted at $f$ a dog $g$ which is raised and lowered by means of a sliding wedge $h$, on which are projections $h^1$, $h^2$, engaging with guides $a^1$ on the link $a$.

The dog $g$ is positively held in its lowered position by means of two inclines $h^3$, $h^4$, on the forward end of the wedge $h$, which are respectively in contact with both the head $g^1$ and the tail $g^2$ of the dog $g$. The dog $g$ is also positively held in its raised position by means of an incline $h^5$ on the rear end of the wedge $h$ which is in contact with the head $g^1$, and another incline $h^6$ which is in contact with the tail $g^2$.

The wedge $h$ is slidden upon the guides $a^1$ by a lever $j$ mounted on a shaft $j^1$ on which is an arm $j^2$ retained in contact with the periphery of a cam $k$ by means of a spring $j^3$ encircling the shaft $j^1$. The cam $k$ is mounted on a shaft $l$ supported in bearings $l^1$, $l^1$. On the shaft $l$ are toothed wheels $l^2$, $l^3$, $l^4$, one or other of which is in mesh with a toothed wheel $m$ which meshes with a toothed wheel $n$ on the shaft $d$. The toothed wheel $m$ is mounted on an arm $m^1$ of a frame $m^2$ which is secured in position by a pin $m^3$ passing through a socket $m^4$ on the frame $m^2$ and through one or other of the holes $m^5$, $m^6$, $m^7$, in the main frame $o$ of the machine.

As the pulleys $c$, $c$, are turned by the chain carrier the shaft $d$ revolves turning the cam $k$, when the arm $j^2$ enters the recess $k^1$ in the cam $k$ and the lever $j$ under the action of the spring $j^3$ engages with the wedge $h$ causing it to slide upon the guides $a^1$ and to raise the dog $g$ into its operative position. The wedge $h$ as the link $a$ travels, comes in contact with a stop $p$ and is caused to slide back upon the guides $a^1$, thus lowering the dog $g$.

What I claim is:—

1. A feeding device for lumber jointing machines comprising a chain, links in the chain, dogs pivoted to the links, each dog actuated by a sliding wedge, and means for sliding the wedge.

2. A feeding device for lumber jointing machines comprising a chain, links in the chain, dogs pivoted to the links, each dog raised and lowered and positively held in either position by a sliding wedge, and means for sliding the wedge.

3. A feeding device for lumber jointing machines comprising a chain, links in the chain, dogs pivoted to the links, each dog actuated by a sliding wedge, a pivoted lever for sliding the wedge, a cam for turning the lever, means for retaining the lever in contact with the cam, means for turning the cam and a stop for sliding back the wedge.

4. A feeding device for lumber jointing machines comprising a chain, links in the chain, dogs pivoted to the links, each dog raised and lowered and positively held in either position by a sliding wedge, a pivoted lever for sliding the wedge, a cam for turning the lever, means for retaining the lever in contact with the cam, means for turning the cam and a stop for sliding back the wedge.

In testimony that I claim the foregoing as my invention I have signed my name this fifth day of April, 1917.

WILLIAM WILLS.

Witnesses:
 Thos. H. Cook,
 C. M. Hitch.

Copies of this patent may be obtained for five cents each, by addressing the "Commissioner of Patents, Washington, D. C."